(12) United States Patent
Schuppan

(10) Patent No.: US 9,994,053 B2
(45) Date of Patent: Jun. 12, 2018

(54) ACHIEVING INK COST SAVING FOR PRINTING DEVICES BY TAKING VISUAL APPEARANCE AND REAL INK COSTS INTO ACCOUNT

(71) Applicant: Electronics for Imaging, Inc., Fremont, CA (US)

(72) Inventor: Holger Schuppan, Bottrop (DE)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days. days.

(21) Appl. No.: 15/142,889

(22) Filed: Apr. 29, 2016

(65) Prior Publication Data

US 2017/0253063 A1 Sep. 7, 2017

Related U.S. Application Data

(60) Provisional application No. 62/301,787, filed on Mar. 1, 2016.

(51) Int. Cl.
| | |
|---|---|
| *H04N 1/60* | (2006.01) |
| *G06Q 30/02* | (2012.01) |
| *B41J 29/38* | (2006.01) |
| *G06F 3/12* | (2006.01) |

(52) U.S. Cl.
CPC ............ *B41J 29/38* (2013.01); *G06F 3/1285* (2013.01); *G06Q 30/02* (2013.01); *G06Q 30/0283* (2013.01); *H04N 1/6058* (2013.01); *H04N 1/6063* (2013.01)

(58) Field of Classification Search
CPC .... H04N 1/6022; H04N 1/603; H04N 1/6033; H04N 1/6058; H04N 1/6061; H04N 1/6088; H04N 1/6097; H04N 1/6063; G06F 3/1208; G06F 3/1257; G06F 3/1285; G06F 3/1219; G06F 315/02; G06Q 30/02; G06Q 30/02833
See application file for complete search history.

(56) References Cited

U.S. PATENT DOCUMENTS

| | | | | |
|---|---|---|---|---|
| 6,088,038 A | * | 7/2000 | Edge | .................... H04N 1/6052 |
| | | | | 345/600 |
| 6,480,299 B1 | * | 11/2002 | Drakopoulos | ....... H04N 1/6033 |
| | | | | 358/1.1 |
| 6,496,280 B2 | * | 12/2002 | Ishikawa | .............. G03C 7/3022 |
| | | | | 358/1.9 |
| 7,057,765 B1 | * | 6/2006 | Fischer | .................. H04N 1/603 |
| | | | | 358/1.9 |
| 7,652,789 B2 | * | 1/2010 | Berns | .................. H04N 1/6033 |
| | | | | 345/598 |
| 8,542,405 B2 | * | 9/2013 | Fischer | .................. H04N 1/603 |
| | | | | 358/1.9 |
| 9,055,264 B2 | * | 6/2015 | Horita | ....................... H04N 1/52 |
| 2003/0093531 A1 | | 5/2003 | Yeung et al. | |
| 2005/0206925 A1 | | 9/2005 | Agehama | |
| 2005/0243335 A1 | | 11/2005 | Giesselmann | |

(Continued)

*Primary Examiner* — Anh T. N. Vo

(74) *Attorney, Agent, or Firm* — Perkins Coie LLP

(57) ABSTRACT

A user defines the real costs for each of the individual inks used in printer and also defines a tolerance level for visual acceptance, defined in CIE units of DeltaE2000. Then, an algorithm performs a search through all nodes of the device link profile and for each node it tries to find an ink combination that creates less costs and is still within the given visual tolerance (<dE2000).

18 Claims, 9 Drawing Sheets

(56) References Cited

U.S. PATENT DOCUMENTS

| | | |
|---|---|---|
| 2009/0010536 A1 | 1/2009 | Mizukami |
| 2010/0005038 A1 | 1/2010 | Nagarajan et al. |
| 2010/0158359 A1 | 6/2010 | Qiao |
| 2013/0265599 A1 | 10/2013 | Faber et al. |
| 2017/0374234 A1* | 12/2017 | Leskanic ................ H04N 1/603 |

* cited by examiner

| Company | Unit price | Blue | Brown | Yellow | Beige | Black | Pink |
|---|---|---|---|---|---|---|---|
| EFI Inks in China | RMB/KG | 100 | 75 | 105 | 80 | 140 | 130 |
| EFI Inks | euro/kg | 14 | 14 | 14 | 14 | 14 | 14 |
| Most ink companies - EU | euro/kg | 11-13 | 10-12 | 10-12 | 10-12 | 13-15 | 13-14 |

In general ink pricing varies from 10 - 15 euros in ceramics market and always varies from customer to customers

FIG. 7

ACHIEVING INK COST SAVING FOR PRINTING DEVICES BY TAKING VISUAL APPEARANCE AND REAL INK COSTS INTO ACCOUNT

CROSS REFERENCE TO RELATED APPLICATIONS

This application claims priority to U.S. provisional patent application Ser. No. 62/301,787, filed Mar. 1, 2016, which is incorporated herein in its entirety by this reference thereto.

FIELD

The invention relates to determining printing costs. More particularly, the invention relates to achieving ink cost saving for printing devices by taking visual appearance and real ink costs into account.

BACKGROUND

The ink layers for printing on printing devices are created according to the settings for light/dark ink splitting in the printer driver and the settings for black generation and spot color handling in the ICC color profiles that are used for color separation. Using such state-of-the art methods, it is not possible to take the real ink cost into account, especially when the inks are dynamically changing. The printing industry works with the assumption that the cost of printing inks is approximately equal but, for instance, in the ceramic industry it may happen that the black ink is twice as expensive compared with other inks, such as brown ink.

Within the CMY color space, a range of colors can be achieved by combining the three primary colors. This combination in its turn can be thought of as a hue component, which requires a maximum of two primary colors, and a grey component, which is a mixture of all three, in an appropriate quantity to give the required saturation. If the grey component is replaced by black ink, the same color is achieved by using two primaries and black. The act of substituting a quantity of black for the grey component is known as Grey Component Replacement (GCR). In GCR, the CMY values that add to grey all along the tone scale can be replaced with black ink.

Additionally, the splitting of light and dark inks is done without consideration of the location of the color to be printed in the color space and thus lead to an unnecessary high amount of light ink usage in dark areas where there is no advantage of using light inks instead of dark inks. The reason for that is the fact that conventional ICC profiling applications are unable to handle light and dark inks as separate colors.

SUMMARY

In embodiments of the invention, a user defines the real costs for each of the individual inks and a tolerance level for visual acceptance, defined in International Commission on Illumination (CIE) DeltaE2000 color difference metric units. Then, an algorithm performs a search through all nodes of a device link profile and for each node it tries to find an ink combination that creates less costs and that is still within the given visual tolerance (<dE2000).

In embodiments of the invention, the creation of the device link (DVL) comprises creating a neutral 1:1 device link in n colors (nCLR), where n=number of inks; start with the first node in the DVL and use chart measurement data to calculate the resulting International Commission on Illumination (CIE) L*a*b* value; loop: modify the ink recipe for this node ink by ink by reducing ink percentage and/or replacing large light percentages with smaller dark ink amounts to reduce total ink costs and recalculate L*a*b* while DeltaE2000 is still within a given tolerance; and go to next node in the DVL, calculate the resulting L*a*b* value.

DRAWINGS

FIG. 7 shows relative ink costs based on color.

DESCRIPTION

In printing, ink costs are becoming an increasingly important consideration. Sometimes, the cost of ink per square meter is the make-or-break argument for a printer sale. Less ink means higher production stability, but may also lead to more graininess and banding. In some cases, ink costs are even more important for the customer than absolute color accuracy. If costs can be lowered substantially, slight color differences may be acceptable. Thus, in many cases it is possible to remove some ink from a given ink combination without any visual impact for the user.

In EFI Cretaprint printers, classic GCR methods do not help because black ink is one of the most expensive inks. As such, it does not help to replace Blue Brown and Yellow with Black (see FIG. 7, which shows relative ink costs based on color).

In EFI Vutek printers, many print modes make use of light and dark ink mixes, but there is no control over this mix in multidimensional color space available. Light/Dark ink separation tables are two-dimensional only and do not take the overall color in account. Even with a "MaxGCR" ICC profile it is possible to waste a huge amount of Light ink or, if the Light/Dark ink separation tables are set up with minimum light ink usage, the printouts may look very grainy due to the clearly visible dark ink droplets.

For example, if the Light/Dark Magenta separation is defined to be 40% light Magenta and 15% dark Magenta at the regular 40% Magenta, then this gives a nice and smooth printout when printing a bright sky. But, if the black generation settings are defined in such away that the darkest patch, seen from the CMM, contains 40% (regular) Magenta, then these 40% are built by 40% Light and 15% Dark Ink, which is unnecessary and, in addition, it increases the total ink amount drastically so that it possibly runs into the total area coverage (TAC) limitation and reduces the printer gamut.

Another aspect is that, depending on the job content (dark, bright, pastels, skin tones, spot colors, etc.), requirements for the GCR and Light/Dark composition may vary. This usually requires re-creating a printer linearization and profile with different settings. It takes quite some time to do this.

Accordingly, embodiments of the invention concern cost-optimization of the color separations of print jobs based on given costs for the individual inks and on a user-defined acceptance level for visual appearance changes. Based on that, the following specifications are defined:

User definable color acceptance difference in CIE units of Delta E2000 can be set to 0.0;

Taking real ink cost into account, using an editable data base of ink vendors and inks;

Full control of Light/Dark ink separation, including definition of protected areas, such as skin tones, highlights, etc.; and The ability to change settings on a per job base and on-the-fly application without the need to re-profile or re-linearize the printer.

Figure 1:
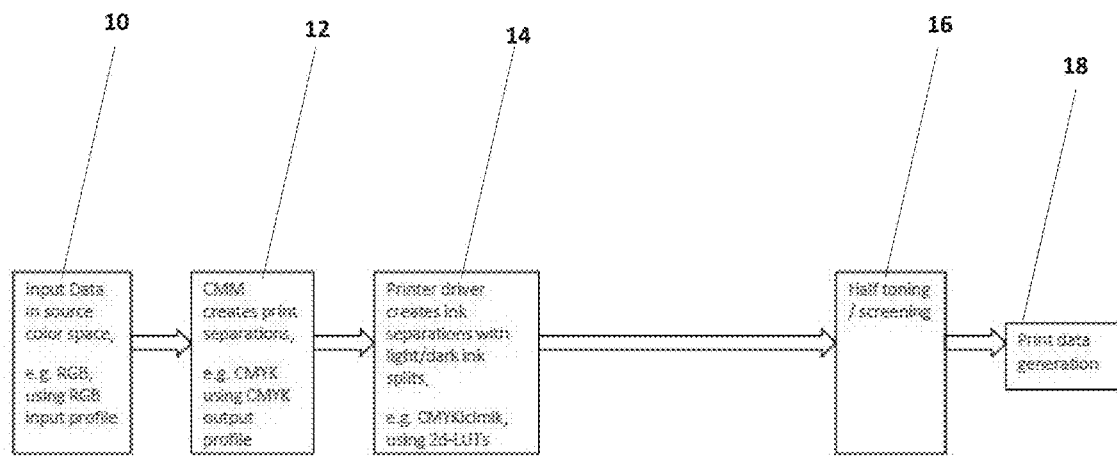
FIG. 1 shows the data flow in an EFI Fiery XF.

FIG. 1 shows the data flow in an EFI Fiery XF. In FIG. 1, input data is shown in source color space, e.g. RGB, using RGB for the input profile 10. The CMM creates print separations, e.g. CMYK, using a CMYK output profile 12. The printer driver creates ink separations with light/dark in splits, e.g. CMYKlclmlk, using 2d-LUTs 14. Halftoning and screening is performed 16 and the print data is generated 18.

In contrast to the approach shown in FIG. 1, embodiments of the invention take the print data after they have been separated into the different inks, and then tries to reduce the ink in each separate layer by a certain amount. The resulting color that is to be printed after the amounts of ink are reduced is then checked to see if it is still within the given tolerance that is defined by the user. Accordingly, embodiments of the invention perform a post-separation step that is based on a tolerance level that is defined by the user, where the color is not exactly identical to the original color, but the color falls within a user-defined range which, in embodiments of the invention, is expressed in units of L*a*b.

The prices of the different inks are entered in the system and embodiments of the invention try to reduce the most expensive ink first to reduce the overall ink cost per page. An algorithm takes the ink prices into account, looks for the most expensive ink, and then takes out an amount of that ink, e.g. 1%, internally with a processor to simulate the resulting output. In this way, embodiments of the invention calculate the usage in color and compare a resulting color with the original color to see if the acceptance level or tolerance is within an acceptable deviation of this color or not. That is, the system verifies that the color is still within the range given by the user. If it is, the system then tries to reduce the ink further until it finds that the distance in color space is bigger than the given tolerance selected by the user. In this case, the system then tries to reduce the second most expensive ink; and this process continues until no more reduction is possible within the predefined acceptance level for color deviation.

Because an ICC profile is already provided for a defined printing condition, embodiments of the invention simulate a feed into the profile, i.e. the system feeds in the new combination of CMYK values, and the profile returns a L*a*b color value, which can be compared with the original L*a*b color value that was received from an original ink recipe for the desired color. These two L*a*b values are compared and a decision is made to continue or to step back. It is not necessary to print and measure or print and scan anything: all determinations can be made completely by the processor.

Typically, the printer has already been characterized when the herein disclosed additional process is performed. Thus, the printer has printed a profiling chart, the chart has been measured, and the profile has been created. This profile can be used as a starting point because the profile is known to be a good characterization of the printer. Embodiment of the invention use this profile internally to calculate the L*a*b color values for certain ink combinations. As noted above, embodiments of the invention try to find ways to reduce the total ink amounts by taking out ink from various ink combinations, after which it is determined whether the resulting color is still in within a predetermined tolerance. The result of this calculation is put into a device link, which is also an ICC profile that goes directly from one color space to a second color space without translating into L*a*b. From L*a*b the device link creates a new separation specification, e.g. it translates directly from CMYK to CMYK, or from 5-color to 5-color, etc. In practice, embodiments of the invention use the device link to process the given separations after they have been created. The creation of the device link is not performed during the processing of images; it is done before as a further process to profile the printer.

Figure 2:
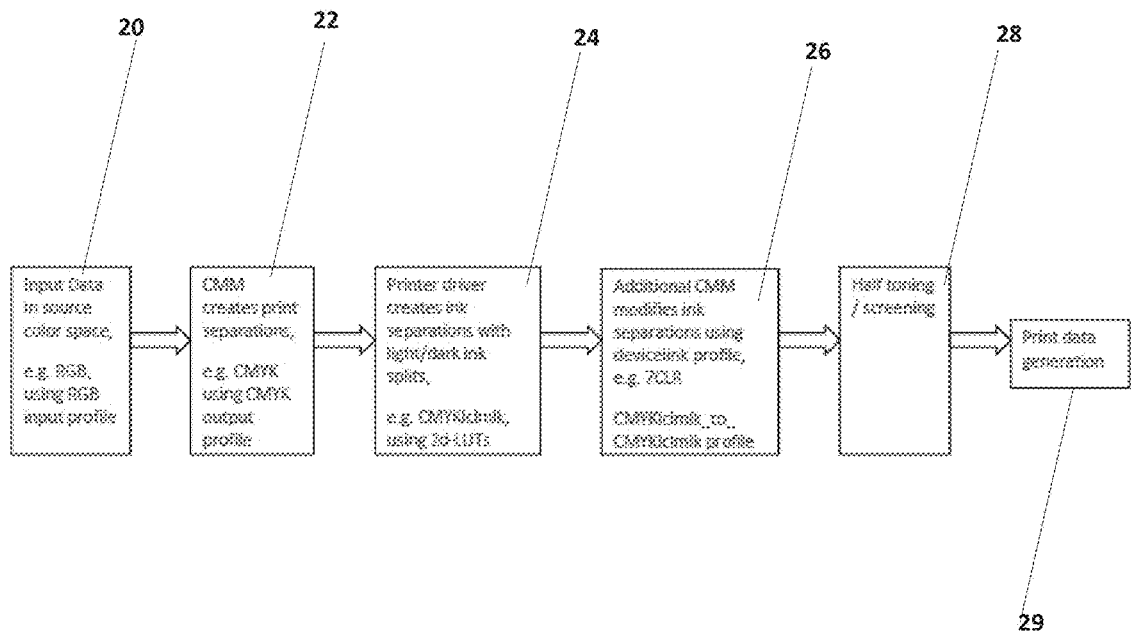
FIG. 2 shows the data flow in a system that incorporates a device link according to the invention.

FIG. 2 shows the data flow in a system that incorporates a device link according to the invention. In FIG. 2, input data is shown in source color space, e.g. RGB, using RGB for the input profile 20. The CMM creates print separations, e.g. CMYK, using a CMYK output profile 22. The printer driver creates ink separations with light/dark in splits, e.g. CMYKlclmlk, using 2d-LUTs 24.

An additional color management module (CMM) modifies ink separations using a device link profile, e.g. 7CLR CMYKlclmlk_to_CMYKlclmlk profile 26. Thus, embodiments of the invention use an nCLR-to-nCLR device link to apply relative changes to the output separations, where n is the number of inks used for printing. This means that, on a printer that is equipped with C_M_Y_K_lightC_lightM_lightK, n is equal to 7 and the algorithm works with a 7CLR_to_7CLR device link profile to modify the existing color separations. Embodiments of the invention can be applied using a set of measurements that may be embedded in an existing ICC profile of the output inks and their overprint combinations.

Thereafter, half toning and screening is performed 28 and the print data is generated 29.

In this embodiment, the user defines the real costs for each of the individual inks and a tolerance level for visual acceptance, defined in CIE units of DeltaE2000, where DeltaE represents the distance between two colors and dE2000 varies the weighting of L* in the L*a*b color space, depending on where in the lightness range the color falls.

Then, a processor implemented algorithm (see FIGS. 3 and 6 below) performs a search through all nodes of the device link profile and for each node it tries to find an ink combination that creates less costs and is still within the given visual tolerance (<dE2000).

Figure 3:
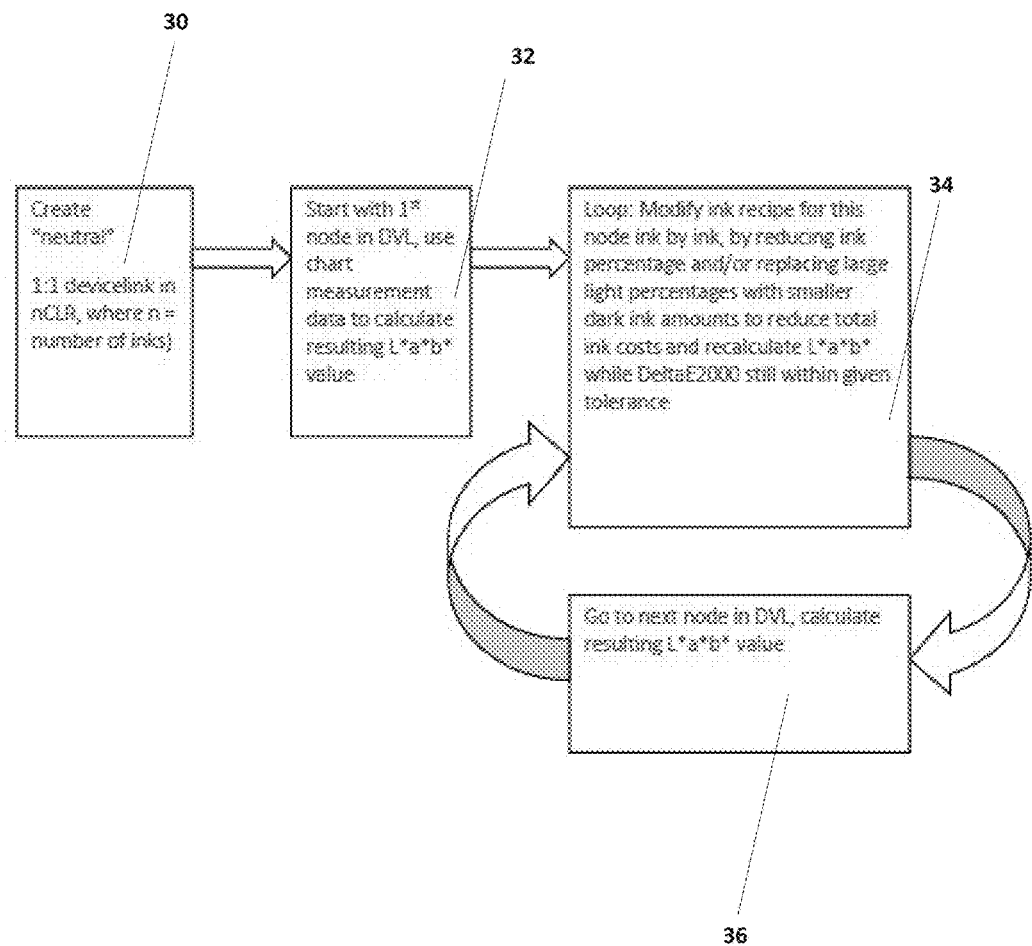
FIG. 3 shows the creation of a device link according to the invention.

FIG. 3 shows the creation of a device link (DVL) according to the invention, which comprises the steps of:

Create a neutral 1:1 device link in nCLR, where n=number of inks 30;

Starting with the first node in the DVL, use chart measurement data to calculate the resulting L*a*b* value 32. In embodiments of the invention, the chart is printed on the printing device and the printed chart is then measured using a standard spectral measurement instrument, e.g. the EFI ES2000, and application, e.g. EFI ColorProfilerSuite;

Loop: Modify the ink recipe for this node ink by ink by reducing ink percentage and/or replacing large light percentages with smaller dark ink amounts to reduce total ink costs and recalculate L*a*b* while DeltaE2000 is still within a given tolerance 34; and Go to next node in the DVL, calculate the resulting L*a*b* value 36.

Figure 4:
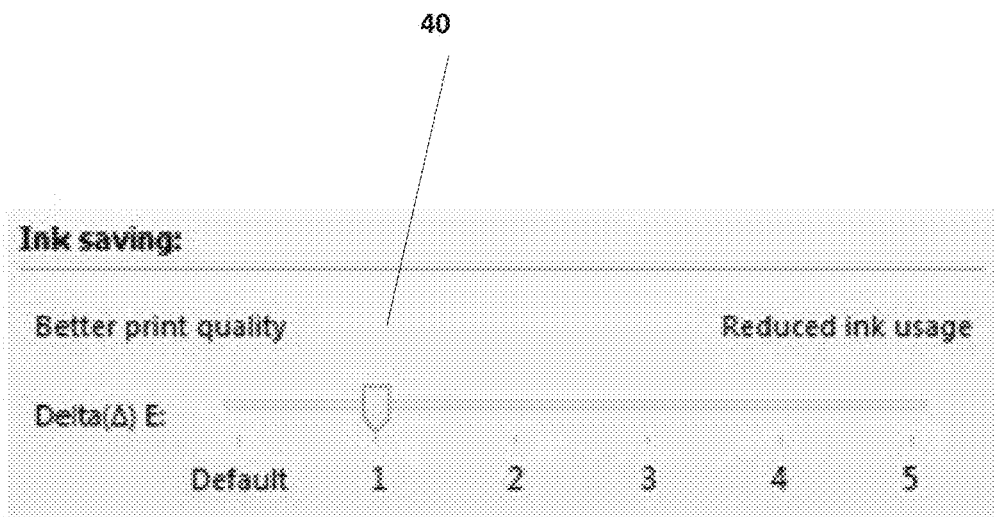
FIG. 4 shows a user interface slider for use in connection with a device link according to the invention.

FIG. 4 shows a user interface slider for use in connection with a device link according to the invention. The slider 40 allows the user to find a desired balance of print quality and ink usage. In this embodiment of the invention, the Delta E value is adjusted between a better print quality setting that uses more ink and a reduced ink usage setting that compromises print quality. First, the user adjusts the slider, then the device link is created which is followed by creation of the print data. That is, based on the slider position, the device link is created before the print data are generated. In embodiments of the invention, this takes place in the software on the computer that creates the color separations that are then sent to the printer.

Figure 5A:
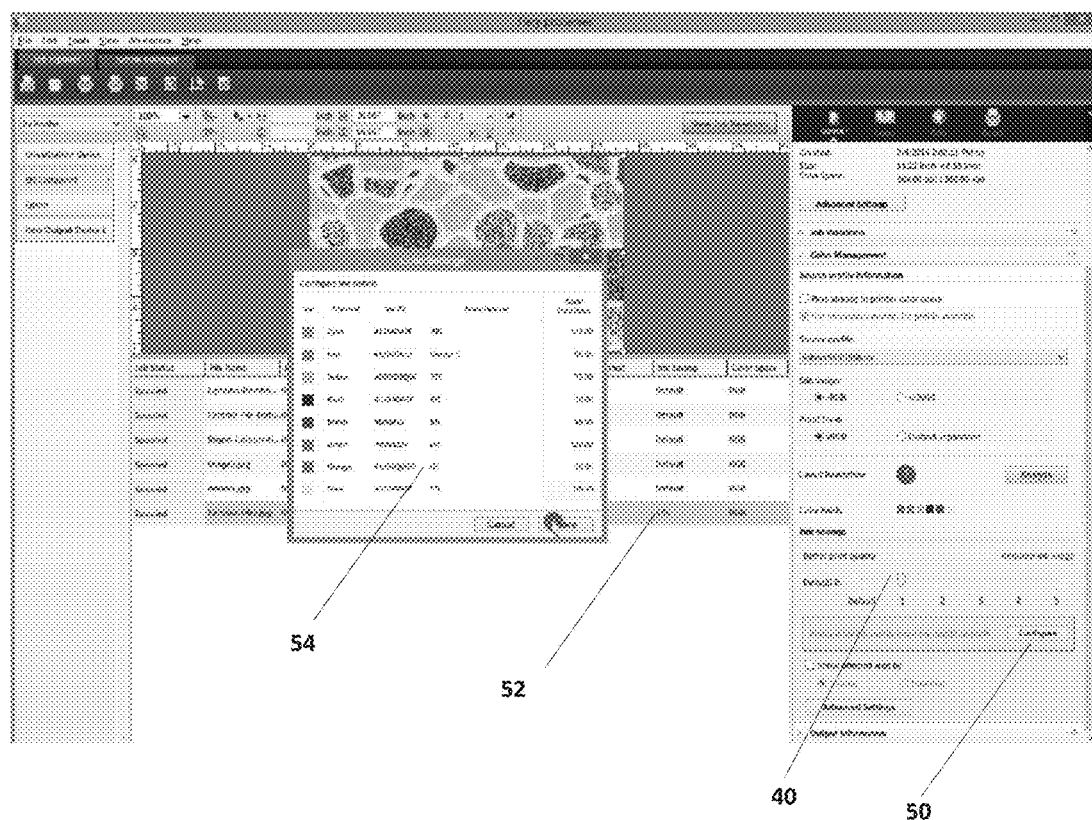
FIGS. 5A-5C show dialog pages for job color management, ink savings, and color settings configuration in connection with a device link according to the invention.
Figure 5B:
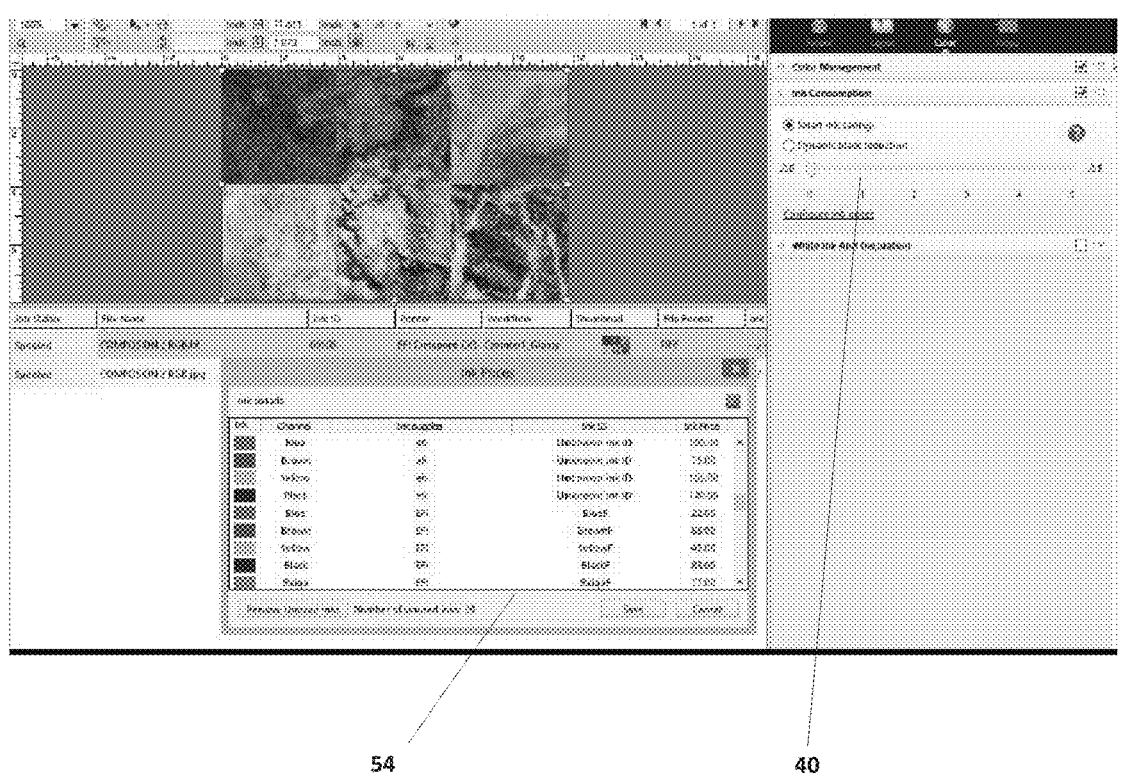
Figure 5C:
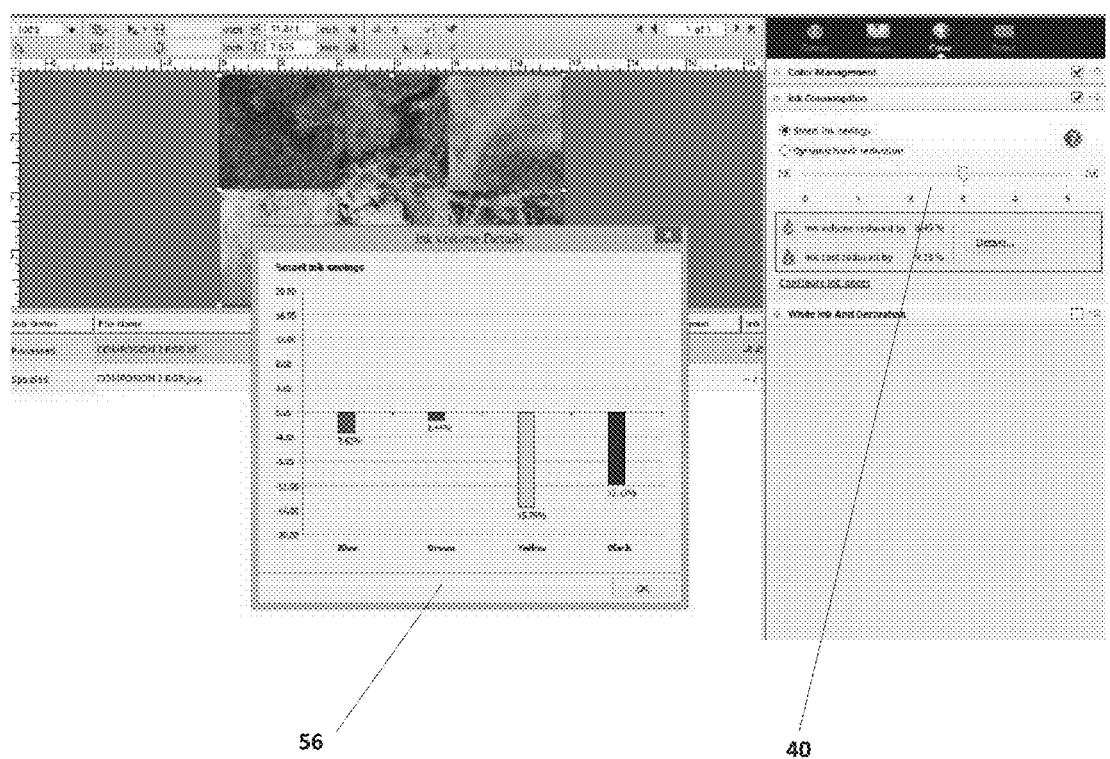

FIGS. 5A-5C show a dialog pages for job color management, ink savings, and color settings configuration in connection with a device link according to the invention After entering the ink cost and other details (see FIG. 5A), on entering CONFIGURE 50 the cost savings 52 is calculated by the system. The ink configuration 54 to effect such savings is also shown (see FIGS. 5A and 5B). The change in ink percentage and in cost 56 is also shown (see FIG. 5C).

Embodiments of the invention strive to keep the visual changes so small that they are nearly invisible. The user preview on the screen is kept updated when the user changes the slider position, but usually the user does not see anything. The software does the check internally by numerical calculation and verification of the tolerance to guarantee that all changes are below the tolerance level that was set by the user. Once the user does this, is the device link saved to the computer that calculates the print file.

Computer System

Figure 6:
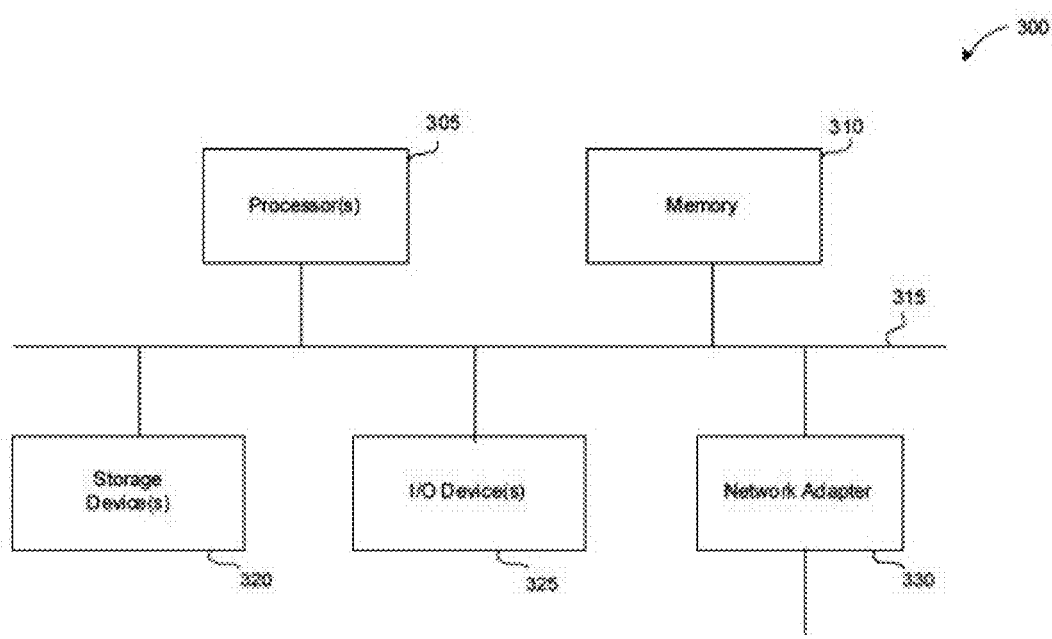
FIG. 6 shows a diagrammatic representation of a machine in the example form of a computer system within which a set of instructions for causing the machine to perform one or more of the methodologies discussed herein may be executed.

FIG. 6 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 300 may include one or more central processing units ("processors") 305, memory 310, input/output devices 325, e.g. keyboard and pointing devices, touch devices, display devices, storage devices 320, e.g. disk drives, and network adapters 330, e.g. network interfaces, that are connected to an interconnect 315. The interconnect 315 is illustrated as an abstraction that represents any one or more separate physical buses, point to point connections, or both connected by appropriate bridges, adapters, or controllers. The modified interconnect 315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 310 and storage devices 320 arc computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 310 can be implemented as software and/or firmware to program the processor 305 to carry out actions described above. In some embodiments, such software or firmware may be initially provided to the processing system 300 by downloading it from a remote system through the computing system 300, e.g. via network adapter 330.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. For example, the device link may be situated within a printer, within a raster image processor, or distributed between the printer and an external device; the device link may be pre-generated by the printer manufacturer and the user is provided with a slider adjustment for controlling ink costs, or the device link may be generated by the user based upon a database of ink and ink costs and in response to analysis of the particular one or more print jobs. Further, the device link may be generated even if no costs are entered by the user, based on default values taken from the industry.

Accordingly, the invention should only be limited by the Claims included below.

The invention claimed is:

1. A method for generating a device ink profile for ink cost saving in a printing device, comprising:

receiving and taking into account a price for each of a plurality of individual inks used by said printing device;

receiving and taking into account a user defined tolerance level for visual acceptance in a print produced by said printing device, wherein said tolerance level is defined using the International Commission on Illumination (CIE) DeltaE2000 color difference metric; and with a processor, performing a search through all nodes of a device link profile and, for each node, finding an ink combination that reduces ink costs while remaining within said tolerance level for said visual acceptance by:

creating a neutral 1:1 device link in an n color (nCLR), where n=a number of inks;

starting with a first node in the device link, using chart measurement data to calculate a resulting International Commission on Illumination (CIE) L*a*b* color space value;

modifying an ink recipe for this node ink-by-ink by reducing ink percentage and/or replacing large light percentages with smaller dark ink amounts to reduce total ink costs;

recalculating the L*a*b* while DeltaE2000 is still within a given tolerance; and
going to a next node in the device link and calculating a resulting L*a*b* value.

2. The method of claim 1, further comprising:
providing an additional color management module (CMM) that modifies ink separations using said device link profile.

3. The method of claim 2, wherein said CMM comprises a seven color (7CLR) CMYKlclmlk_to_CMYKlclmlk profile.

4. The method of claim 2, wherein said device link comprises:
an nCLR-to-nCLR device link that is used to apply relative changes to the ink separations, where n is the number of colors (CLRs) of inks used for printing.

5. The method of claim 2, further comprising:
embedding a set of measurements in an existing International Color Consortium (ICC) profile of output inks and overprint combinations.

6. The method of claim 1, further comprising:
a user, via a user interface, defining the price for each individual ink of said plurality of and the tolerance level for visual acceptance.

7. The method of claim 1, further comprising:
said processor implementing a user interface slider for use in connection with said device link, said user interface slider allowing a user to find a desired balance of print quality and ink usage wherein, in response to a user setting, the International Commission on Illumination (CIE) DeltaE2000 color difference metric value is adjusted by said processor between a better print quality setting that uses more of said ink and a reduced ink usage setting that compromises print quality.

8. An apparatus for generating a device ink profile for ink cost saving in a printing device, comprising:
a processor performing a search through all nodes of a device link profile and, for each node, finding an ink combination that reduces ink costs while remaining within a predetermined tolerance level for visual acceptance by:
creating a neutral 1:1 device link in an n color (nCLR), where n=a number of inks;
starting with a first node in the device link, using chart measurement data to calculate a resulting International Commission on Illumination (CIE) L*a*b* color space value;
modifying an ink recipe for this node ink-by-ink by reducing ink percentage and/or replacing large light percentages with smaller dark ink amounts to reduce total ink costs;
recalculating the L*a*b* while DeltaE2000 is still within a given tolerance; and
going to a next node in the device link and calculating a resulting L*a*b* value.

9. The apparatus of claim 8, further comprising:
an additional color management module (CMM) that modifies ink separations using said device link profile.

10. The apparatus of claim 9, wherein said CMM comprises a seven color (7CLR) CMYKlclmlk_to_CMYKlclmlk profile.

11. The apparatus of claim 9, wherein said device link comprises:
an nCLR-to-nCLR device link that applies relative changes to the ink separations, where n is the number of colors (CLRs) of inks used for printing.

12. The apparatus of claim 9, further comprising:
a set of measurements embedded in an existing International Color Consortium (ICC) profile of output inks and overprint combinations.

13. The apparatus of claim 8, further comprising:
a user interface for defining the price for each individual ink of said plurality of inks and the tolerance level for visual acceptance.

14. The apparatus of claim 8, further comprising:
said processor providing a user interface slider for use in connection with said device link, said user interface slider allowing a user to find a desired balance of print quality and ink usage wherein, in response to a user setting, the International Commission on Illumination (CIE) DeltaE2000 color difference metric value is adjusted by said processor between a better print quality setting that uses more of said ink and a reduced ink usage setting that compromises print quality.

15. A method for achieving ink cost savings in a printer, comprising:
a processor iteratively reducing a value that determines how much ink is to be used in each separate layer of a print job by a predetermined amount, wherein print data is received after the print job is separated into each of a plurality of different inks that together the comprise the ink that is used to print said print job; and
said processor checking a resulting color that is to be printed after the ink to be used in each separate layer is reduced to determine if a resulting color is within a given user-defined tolerance, wherein the resulting color is not exactly identical to an original color, and wherein the resulting color falls within said user-defined tolerance.

16. The method of claim 15, further comprising:
said processor accessing a database of prices of the plurality of different inks;
said processor reducing a value that determines an amount of ink for a most expensive ink first to reduce the overall ink cost per page;
said processor comparing a color that results from said reducing of a value that determines an amount of ink for said most expensive ink with the original color to determine if the color that results falls within said user-defined tolerance;
when the color that results falls within said user-defined tolerance, the processor reducing the value that determines the amount of ink further until it finds that a distance in color space is bigger than the user-defined tolerance;
thereafter, the processor reducing a value that determines the amount of a second most expensive ink; and
the processor continuing accordingly until no more reduction in ink is possible within the user-defined tolerance.

17. An apparatus for achieving ink cost savings in a printer, comprising:
a processor configured for iteratively reducing a value that determines how much ink is to be used in each separate layer of a print job by a predetermined amount, wherein print data is received after the print job is separated into each of a plurality of different inks that together the comprise the ink that is used to print said print job; and
said processor configured for checking a resulting color that is to be printed after the amount of ink to be used in each separate layer is reduced to determine if a resulting color is within a given user-defined tolerance, wherein the resulting color is not exactly identical to an original color, and wherein the resulting color falls within the user-defined tolerance.

18. The apparatus of claim 17, further comprising:
said processor configured for accessing a database of prices of the plurality of different inks;
said processor configured for reducing a value that determines an amount of ink for a most expensive ink first to reduce overall ink cost per page;
said processor configured for comparing a color that results from said reducing of a value that determines an amount of ink for said most expensive ink with the original color to determine if the color that results falls within said user-defined tolerance;
when the color that results falls within said user-defined tolerance, the processor configured for reducing the value that determines the amount of ink further until it finds that a distance in color space is bigger than the user-defined tolerance;
thereafter, the processor configured for reducing a value that determines the amount of a second most expensive ink; and
the processor configured for continuing accordingly until no more reduction in ink is possible within the user-defined tolerance.

* * * * *